United States Patent [19]
von Allwoerden

[11] Patent Number: 5,255,500
[45] Date of Patent: Oct. 26, 1993

[54] CUTTER UNIT FOR COMBINES

[75] Inventor: Wilhelm von Allwoerden, Gailingen, Fed. Rep. of Germany

[73] Assignee: Kloeckner-Humboldt-Deutz AG, Fed. Rep. of Germany

[21] Appl. No.: 851,749

[22] Filed: Mar. 16, 1992

[30] Foreign Application Priority Data

Mar. 15, 1991 [DE] Fed. Rep. of Germany ....... 4108494

[51] Int. Cl.$^5$ ..................... A01D 45/02; A01D 45/30
[52] U.S. Cl. ......................... 56/63; 56/14.4; 56/220
[58] Field of Search ............... 56/14.4, 56, 63, 122, 56/123, 219, 220, 307

[56] References Cited

U.S. PATENT DOCUMENTS

| | | | |
|---|---|---|---|
| 1,456,012 | 5/1923 | Saunders | 56/63 |
| 2,340,563 | 2/1944 | Riddle | 56/63 X |
| 3,014,326 | 12/1961 | Murray | 56/219 X |
| 3,025,653 | 3/1962 | Ackermann | 56/63 X |
| 3,397,520 | 8/1968 | Johnston et al. | 56/14.3 X |
| 3,399,517 | 9/1968 | Magee | 56/63 X |
| 3,422,160 | 1/1969 | Wetherell | 56/63 |
| 3,596,448 | 8/1971 | Van Buskirk | 56/63 |
| 3,914,923 | 10/1975 | Arends | 56/63 |
| 4,565,056 | 1/1986 | Heidjann | 56/14.4 |
| 4,589,250 | 5/1986 | Faul, Jr. | 56/14.4 X |

FOREIGN PATENT DOCUMENTS

| | | | |
|---|---|---|---|
| 650545 | 3/1979 | U.S.S.R. | 56/63 |
| 1565395 | 5/1990 | U.S.S.R. | 56/56 |

OTHER PUBLICATIONS

Claas Brochure (85/86 Program, pp. 4–5).
Mengele Brochure (SF 2000/SF 3000) "Anbaugeraete mit Schnellverschluss, 1976 (Attachments With Rapid-Action Locking)".

*Primary Examiner*—George A. Suchfield
*Attorney, Agent, or Firm*—Hill, Steadman & Simpson

[57] ABSTRACT

A method and mechanism for harvesting standing crops for a combine such as rows on corn of sunflowers including flattening the stalks and removing the tops, first encountering the stalks with leading separating devices fashioned as ships for separating the crop plants arranged in rows, engaging the stalks with a rotary shaft and with a draw-in drum having dogs on the surface, engaging the plants with a reaper element and then with a deflection shaft all for flattening the plants and removing the tops and conveying the tops laterally inwardly with an auger to pass to a conveying channel to be transported to a harvesting combine.

14 Claims, 4 Drawing Sheets

CUTTER UNIT FOR COMBINES

BACKGROUND OF THE INVENTION

The present invention is related to improvements in harvesting units and particularly to a cutter unit for a combine for harvesting specialty crops such as corn and sunflowers.

As is known, combines are utilized for harvesting grain and separating the grain from the stalks but such combines have not proven fully successful for harvesting specialty crops such as corn and sunflowers with an ordinary grain cutter unit. One substantial obstacle exists in that the size and length of the stalk of the specialty crop is such that the dimensions of standard cutter units are inapplicable. For example, the length of a receiving table and the diameter of rotating elements are not adapted to the great height of specialty crops.

In order to improve the harvesting result of such specialty crops, conversion kits or front attachment kits for cutter units have been developed and these are frequently intended for one specialty crop such as corn, sunflowers or other crops. The normal grain cutter unit is replaced by one of these specialty crop cutter units. However, the employment of a specialty cutter unit for every specialty crop causes high capital costs for the operator of the combine. This results in that the economic feasibility of a given combine is diminished, particularly when the amount of any specialty crop to be harvested is small.

It is accordingly an object of the present invention to provide an improved cutter unit and method of cutting for various specialty crops, particularly such as corn and sunflowers and to provide a unit wherein these crops can be harvested loss free.

A further object of the invention is to provide an improved cutter for a combine for the harvesting of specialty tall stalk crops wherein the cutter comprises a simplified cost beneficial and effective structure that can handle more than one type of tall specialty crop.

FEATURES OF THE INVENTION

In accordance with the principles of the invention, a cutter unit is provided which attaches replaceably on the front of a combine harvester unit to be installed in place of a standard cutter for the combine unit. In the specialty cutter, a transverse shaft is carried on the cutter which is located preceding a reaping element of a traditional cutter and extends laterally relative to the direction of travel of the combine harvesting unit. When harvesting, this rotary shaft which precedes the reaper over the entire width of the cutter causes the tall plants such as corn and sunflowers to be pressed forwardly relative to the traveling direction of the combine. On the leading edge of the cutter are lifter or separating devices which are fashioned as ships and which precede the reaper element being spaced to accommodate the plants which are arranged in rows and are situated to guide the stalks of the specialty crop into the cutter. The cutter is vertically adjustable.

During harvesting as the cutter unit moves forward, the stalks proceed into the reaper element with only the tops removed so that the thresher element of the combine are not loaded with a high mass part of the stalk to thereby effect a substantial improvement in the working speed of the combine.

In an earlier patent U.S. Pat. No. 3,397,520, a reaper is disclosed which is preceded by a shaft above a reaper bar with stalk material being pressed forward with a shaft. However, the mechanism relates to a hay harvesting and conditioning device wherein the stalk material is the valuable portion being harvested and the objective is to obtain the full stalk. Such apparatus is intended to effect an intentional deflection of the mown stalk material and the stalk material passes to a conditioning means that follows a finger bar reaper. The conditioning means includes horizontally arranged nip rollers driven in opposite direction to process the stalk material and thus accelerate the drying process for the stalk material deposited on the ground. This previous apparatus works on material which is mown in full length so as to obtain the full stalk and this proceeds into the conditioner. There is no teaching in such prior devices which require obtaining the full stalk material. A known finger bar reaper such as shown in that previous patent is to mow the stalk material over the entire length and to process it and this is not comparable to the object of the mechanism of the instant invention wherein the useful grain normally at the top plant is to be harvested and the actual volume of the stalk is to be avoided as overtaxing the combine and reducing its capacity.

In the arrangement of the cutter unit of the present invention, the effect of the rotary shaft preceding the reaper is augmented or intensified by a draw-in drum which also precedes the reaper element and which is located between the shaft and the reaper element. The draw-in drum serves the purpose of seizing the specialty crop in the area of the ships. The shaft and draw-in drum preferably precede the reaper element and are graduated in height.

Further, a deflection shaft extends over the entire width of the cutter unit and is attached further below the cutter unit following the reaper element in the direction of unit travel. The deflection shaft operates so that as the plant stalks are pulled down from the reaper element, the shaft presses these against the ground and prevents a blockage of devices at the cutter unit and avoids a plugging of the reaper element.

The structural arrangement provides a drive for the various rotary units including the leading rotary shaft. The plants are pressed down and the upper end or the grain carrying end is separated from the lower stalk and the grain is delivered onto a receiving table with the stalks being withdrawn from the reaper element and this is augmented by a mutual support of the individual components parts. A drive in the same direction is preferably provided for all component parts with the rotational direction coinciding with that of a draw-in auger. It is also contemplated, however, to drive the leading rotary shaft and the deflection shaft in a rotational direction opposite the draw-in drum.

The effect of the draw-in drum can be further improved with controlled dogs in the form of tines that comprise an eccentric drive. The arrangement of the tines or dogs on the draw-in roller is such that they are located to coincide with the slots between the ships. A directed forwarding of the harvested material guided by the ships can thus occur.

For increasing the effect of the deflection shaft, it may be provided with strippers for the effective withdrawal of the plant stalks from the reaper element. To that end, the strippers are provided on the shaft arranged offset by 180° circumferentially. Each is located axially or transversely in the region of the draw-in slots between the ships to act intermittently on the plant stalks.

In a preferred arrangement of the cutter unit, the axial center of the draw-in drum and the leading rotary shaft are at an angle of approximately 45° relative to a horizontal line extending from the reaper element. The axial spacing between the draw-in drum and the leading shaft coincides with the spacing between the reaper element and the draw-in drum. Alternatively to the above described structure of the cutter, it can be equipped with a traditional hasp employed for a grain cutter unit instead of being equipped with a draw-in drum.

The apparatus further provides for a use of the supporting frame to promote the deflection of the shaft on the tall specialty crops. A supporting frame serves the purpose of supporting the hasp in grain cutter units and is equipped with a cross connection for harvesting specialty crops and can be vertically adjusted with infinite variation and thus can be adapted to the height of the plants of the specialty crops.

In order to present a cost beneficial cutter unit for specialty crops, the structure is provided as a front end attachment with a grain cutter unit. The essential component parts of the standard cutter unit, such as the conveying channel, receiving table, draw-in auger, reaper element and supporting frame are supplanted by a front end attachment that is mainly formed of the draw-in drum, shaft, ships, deflection shaft and lateral limitation walls.

Other objects, advantages and features will become more apparent with the teaching of the principles of the invention in connection with the disclosure of the preferred embodiments thereof in the specification, claims and drawing, in which:

DESCRIPTION OF THE PREFERRED EMBODIMENTS

Figure 1:
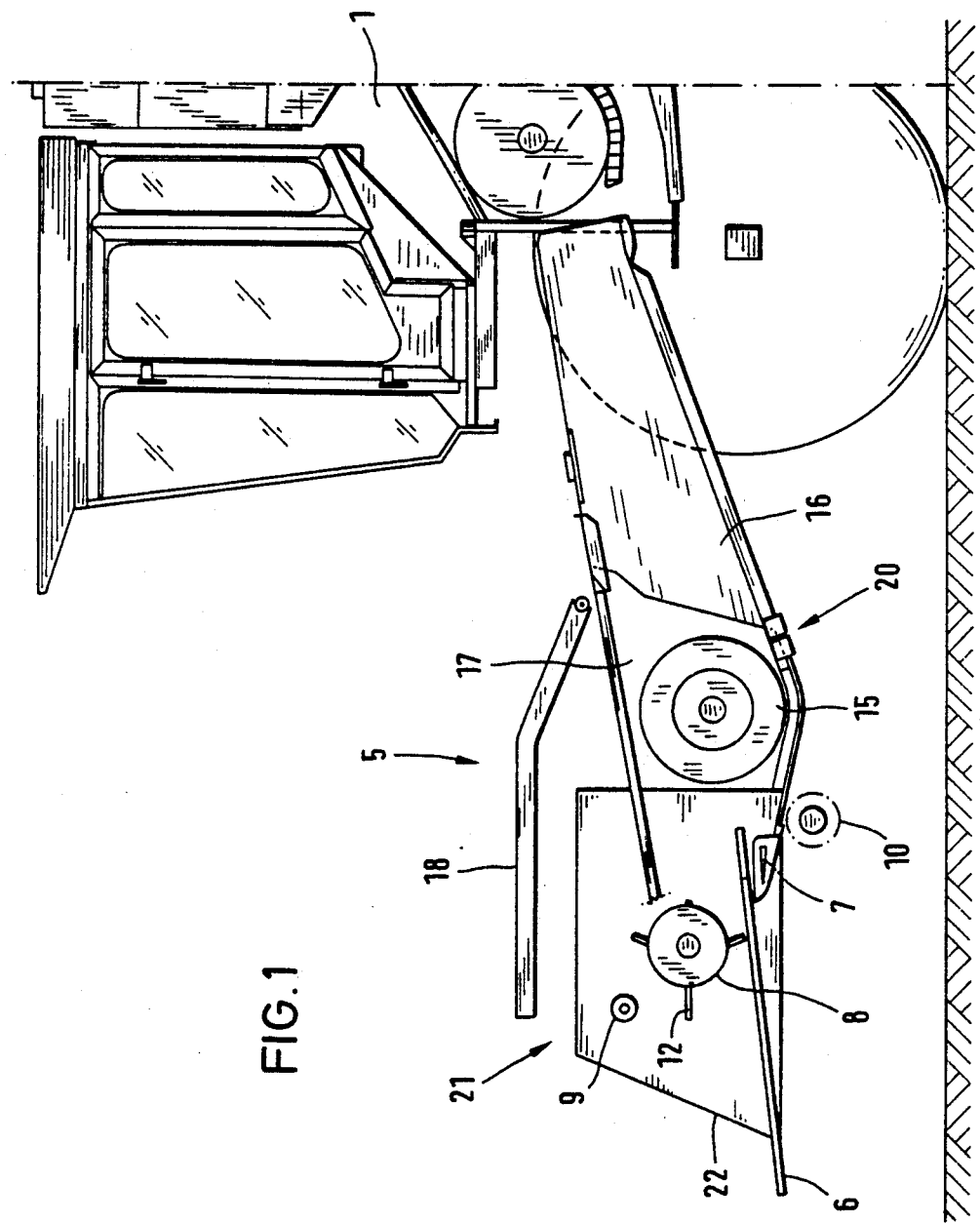
FIG. 1 is a side elevational view of a cutter unit mounted on the front of a combine, with the cutter unit constructed and operating in accordance with the principles of the present invention, and being shown in somewhat schematic form with detailed parts omitted for clarity.

FIG. 1 shows the cutter unit generally at 5 as being attached to the front of a combine 1. The details of the combine are omitted but the general location of the driver's compartment and the front axle of the combine 1 are illustrated. The cutter unit 5 is movably joined to the combine 1 and is adjustable with continuous variation in a vertical direction by hydraulic devices, not shown, which enable the cutter to be vertically adjusted for adapting its height to the crop to be harvested.

The cutter 5 includes a reaper element 7 with which the stalk or stem of the plants of the crop are cut. The reaper element may take various forms such as well known to those versed in the art including laterally movable sickles and similar cutters.

At the forward edge of the cutter are separating devices fashioned as ships for separating crop plants arranged in rows such as frequently the case with tall specialty crops including corn and sunflowers.

Arranged above the ships 6 are a lead rotary shaft 9 and a draw-in drum 8 which are arranged at an elevation above the reaper element 7. These are graduated in height with the rotary shaft 9 preferably being higher and the draw-in drum 8 arranged somewhat lower. These are preferably arranged to be located at an angle of 45° relative to a horizontal plane passing through the reaper element 7.

A deflection shaft 10 is arranged under the reaper element and trailing the reaper element in the direction of combine travel, which of course, is from right to left as illustrated in the drawings of FIGS. 1 through 5.

The tall plants to be harvested ar supplied to the reaper element by the action of the draw-in drum 8 having dogs 12 on the surface. Following the reaper element, the upper ends of the stalks are cut and pass to a draw-in worm or auger 15.

Figure 6:
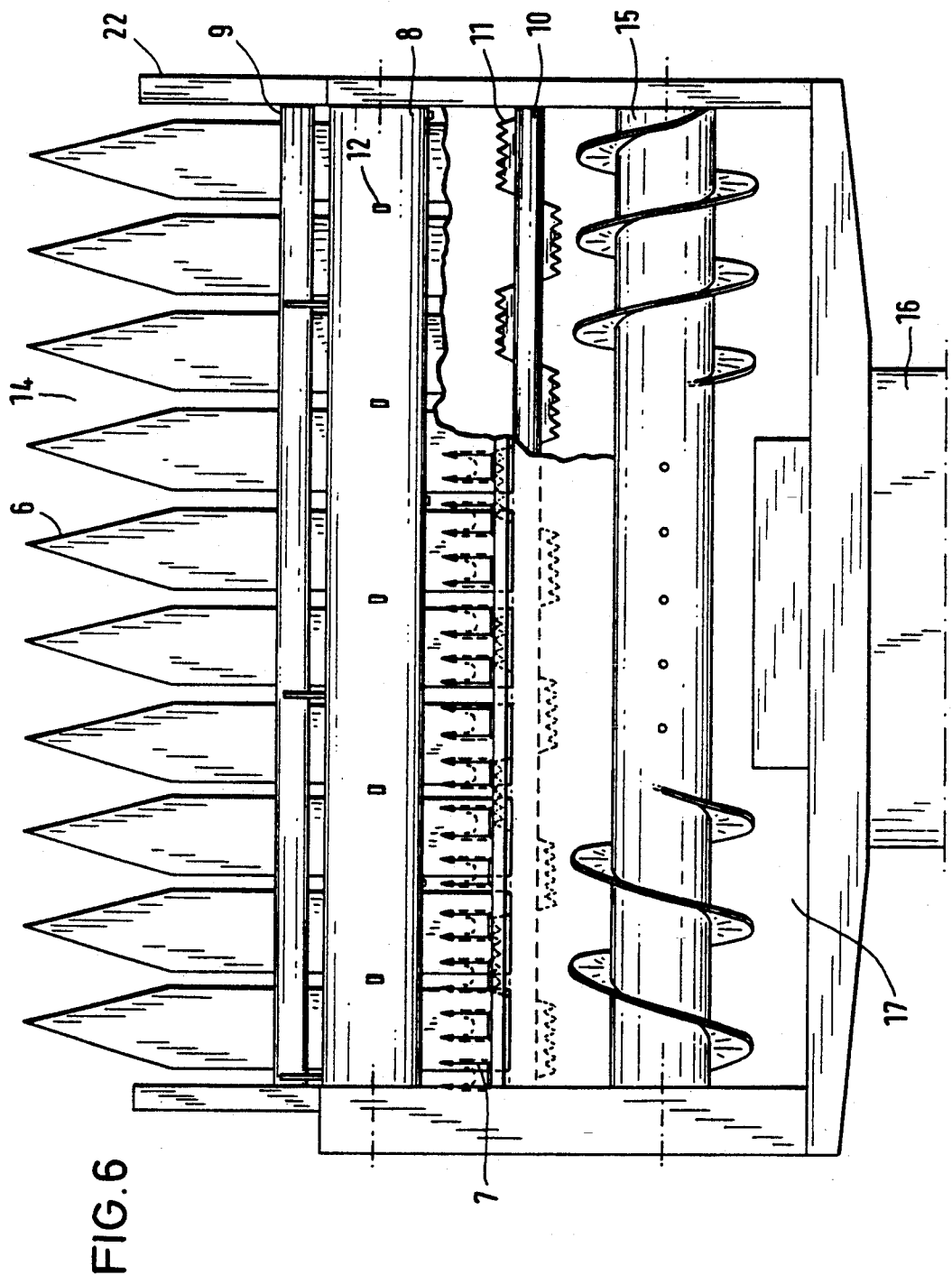
FIG. 6 is a plan view of the cutter with portions shown somewhat schematically.

As illustrated in the drawing and particularly in FIG. 6, the draw-in drum 8, the leading shaft 9, and the deflection shaft 10 extend over the entire cutting width of the cutter unit 5. The draw-in worm or auger 15 has the job of conveying the harvest supplied to it over the entire width of the cutter and to move the cut stalk portions inwardly to a conveying channel 16 which is narrower than the width of the cutter unit. From the conveying channel 16, the grains contained with the stalk are supplied to the threshing element of the combine by a suitable conveyor means such as chain conveyors or conveyor belts or conveyor aprons.

As illustrated generally in FIG. 6 indicated by the word DRIVE, the drive arrangement drives various elements in rotation including the shaft 9, the drum 12, the deflection shaft 10 and the auger 15. These are preferably driven in the same rotational direction. This rotational direction preferably is the same direction as the wheels of the combine during harvesting. Power for the drive can preferably be obtained from a power take-off of the motor driving the unit or from traction wheels. It is also contemplated that the drive will be such that the shaft 9 and the deflection shaft 10 are driven in a direction opposite that of the remaining rotational parts. It is also contemplated that a variable speed control be arranged so that the rotational speeds of the various parts can be adjusted, although inasmuch as this will add to the construction costs of the unit, such control is not always necessary.

The cutter unit 5 is preferably fashioned as an individual unit replaceably attachable to the front end of the combine as a substitute for a traditional grain cutter unit. For this purpose, a standard part 20 is provided allowing for replaceable attachment of the front end unit 21. The standard part 20 includes component parts of the conveying channel 16, the draw-in auger 15, a receiving table 17, the reaper element 7, as well as a supporting frame 18. The front end attachment 21 includes the lateral limitation walls 22 and the shaft 9 and deflection shaft 10 as well as the draw-in drum 8 with the plurality of ships 6.

Figure 2:
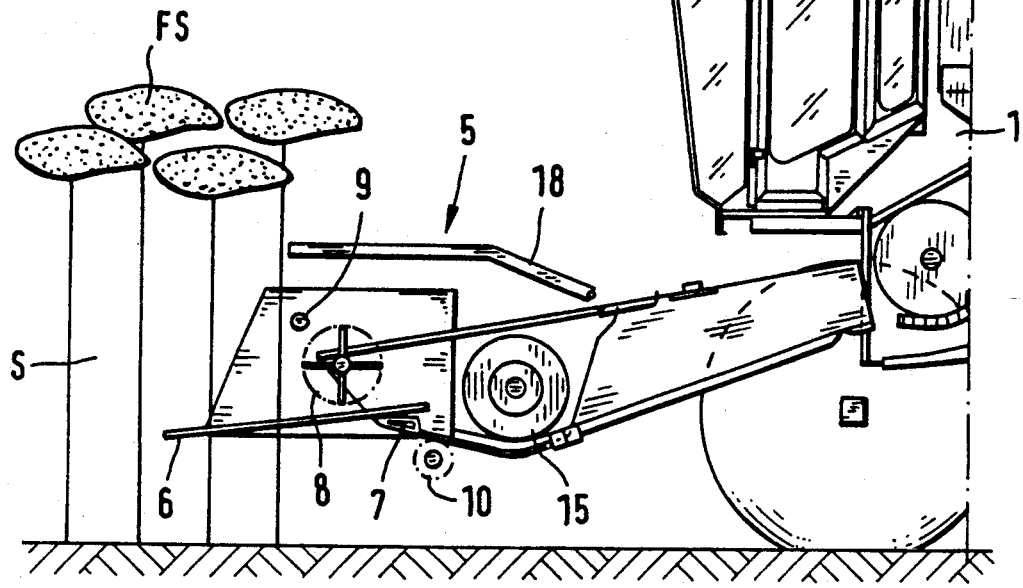
FIG. 2 is a similar view showing the cutter approaching tall stalk specialty crops.

The reaping of specialty crops which is obtained with the mechanism illustrated and described can be shown schematically in the sequence of FIGS. 2 through 5. In this sequence, the arrangement begins in FIG. 2 with the tall stalk material standing erect and being engaged by the cutter in the sequence from FIGS. 2 through 5. In FIG. 2, the specialty crop having the tall stalks is indicated by the letter S. The specialty crops are erect and normally planted in rows so that they pass into the draw-in slots of the ships 6. Supporting side bars provide lateral frame members 18 which function to provide a buckling or falling of the specialty crop in the direction of the operator's compartment of the combine 1 during the harvesting process.

Figure 3:
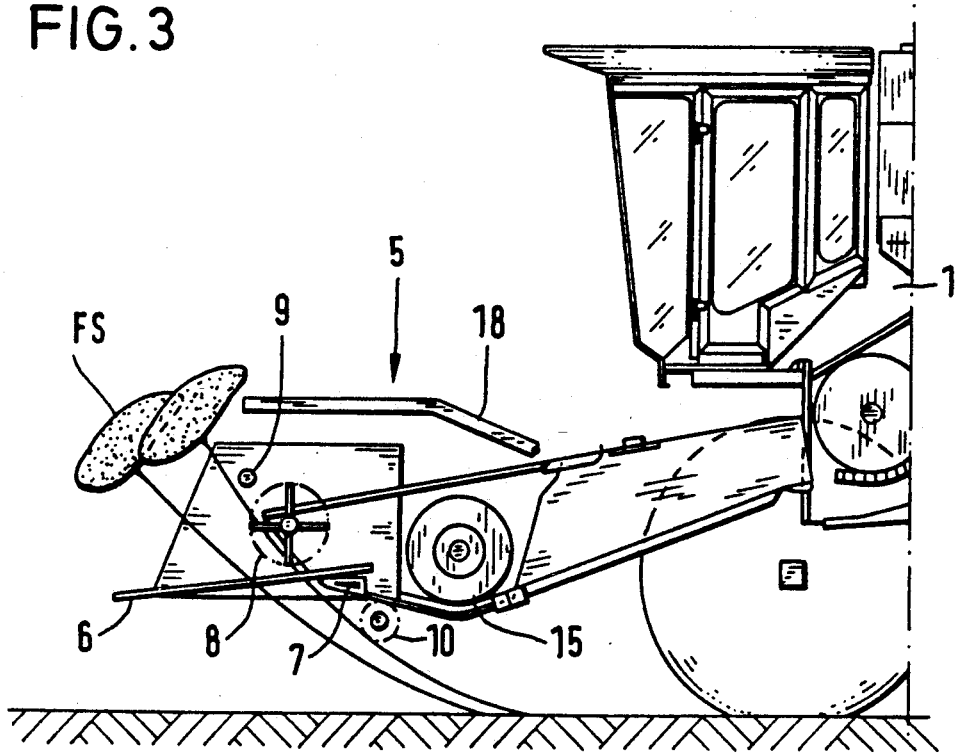
FIG. 3 is a schematic side elevational view illustrating the cutter of FIGS. 1 and 2 progressing further into the tall stalk material.

FIG. 3 shows the combine moved further into the stand of the crop and the stalks are pressed down in the direction of travel. The stalks engaged by the shaft 9 are also engaged by the drum 8 and pass back to be engaged by the deflection shaft 10.

Figure 4:
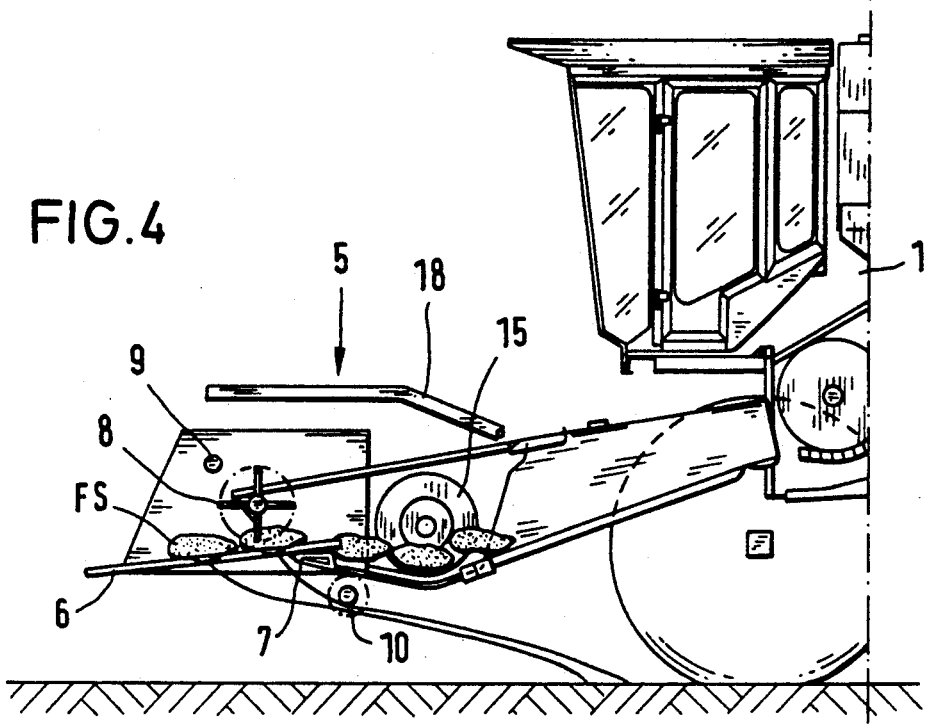
FIG. 4 is another side elevational partially schematic view showing the cutter progressing even further into the tall stalk material.

FIG. 4 illustrates the cutter unit which operates so that only the grain portion or the upper end of the stalk is harvested. As the combine moves further, the stalks of the specialty crop S glide in through the draw-in slots of the ships 6 up to the neck SF of the specialty crop. Subsequently, the neck of the stalk is moved forwardly into the reaper element 7 assisted by the draw-in drum 8 and dogs 12 on the surface thereof. The stalk of the specialty crop which represents a great mass part thus does not disadvantageously load the thresher elements of the combine which simultaneously effects an improved quality of the harvested crop. It also prevents loading the combine with unwanted stalk material which decreases its capacity but also decreases its efficiency and effectiveness of separating the grain from the stalk.

Figure 5:
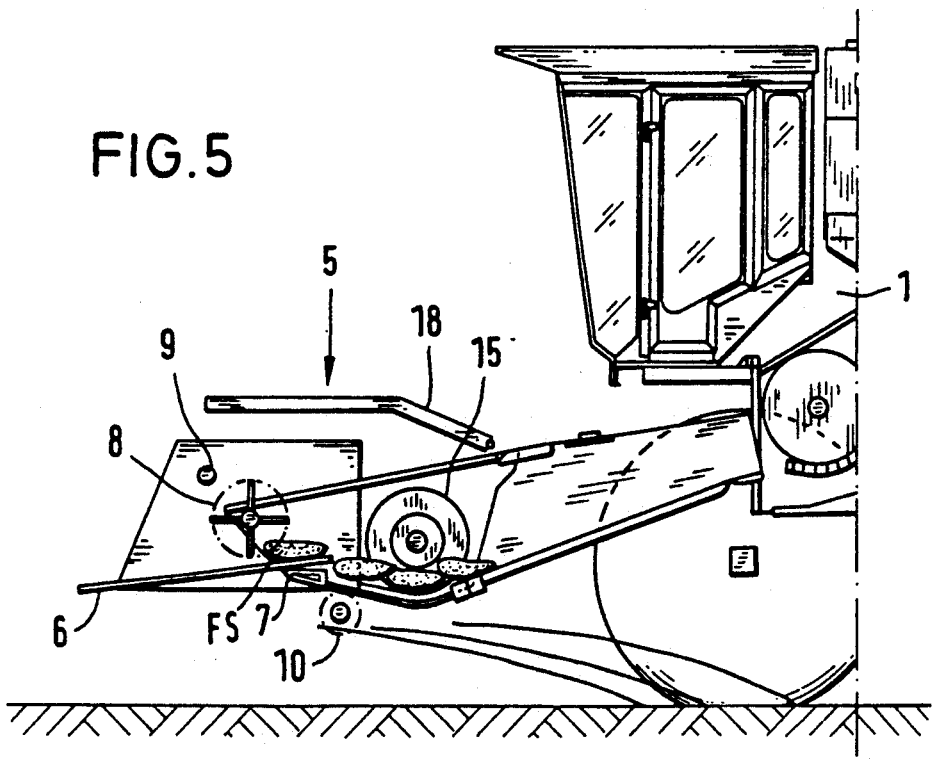
FIG. 5 is another view proceeding after FIG. 4 showing further processing of the tall stalk material.

The effect of the deflection shaft 10 is illustrated in FIG. 5. In this position of the combine, the stalk neck SF of the specialty crop has been separated by the reaper element 7 and the long remaining base stalks of the specialty crop S are pulled from the reaper element 7 with the assistance of the deflection shaft 10 and are pressed into the direction toward the ground in order to avoid a blockage of the reaper element 7. This also gets the stalks out of the way of other component parts of the cutter unit 5 such as drive chains or rotating shafts.

The functioning of the individual component parts of the cutter 5 is further illustrated by the plan view of FIG. 6. The separating devices, or lifters, or ships, are arranged at a distance from each other to provide the individual draw-in slots 14 into which the rows of stalks pass. The division spacing of the ships 6 corresponds to the spacing of the rows of the specialty crop and may be provided with adjustments to reset them in accordance with the row spacing. Other elements arranged in alignment with the slots then must be similarly adjusted in an axial direction, that is, transversely of the cutter.

The specialty crop S to be harvested is first guided into the draw-in slot 14 and is subsequently passed down in the traveling direction by the lead rotary shaft 9. The stalk is engaged by the drum 8 and its dogs and is guided to the reaper element 7 with the dogs 12 of the drum 8. The grain neck or top is separated from the stalk in the reaper element 7.

As a result of the draw-in worm 15 placed immediately behind the reaper element 7, the reaped element is first conveyed laterally inwardly toward the center region of the receiving table 17, and it is then forwarded onto the conveying channel 17 by which the reaped material is supplied to the threshing means.

The installed location of the deflection shaft 10 under the reaper element 7 is located slightly behind and under the reaper element and is the shaft provided with strippers 11. The strippers are laterally arranged to coincide with the location of the dogs 12 of the draw-in drum 8. These are each in alignment with the draw-in slots 14. The strippers 11 arranged on the deflection shaft 10 are positioned in the region of the draw-in slots 14.

Thus, it will be seen that there has been provided an improved cutter unit which is particularly well suited to the harvesting of tall stalk plants such as corn and sunflowers which meets the objectives and advantages above set forth. In operation, an operator will place the cutter on the front of the combine in place of a previously used grain cutter. The combine then will be propelled through the field of the tall stalk specialty material where it will be pressed down and the tops of grain or fruit containing portions will be cut by the reaper to be conveyed into the combine.

I claim as my invention:

1. A mechanism for harvesting standing crops for a combine comprising in combination:
   a cutter unit for a harvesting machine extending transversely relative to a direction of travel of the machine, said unit being vertically adjustable;
   draw-in and reaper elements on the cutter unit with said reaper elements having plant cutters;
   a plurality of forwardly extending laterally spaced separating devices fashioned as ships defining a plurality of row receiving slots between them for separating crop plants arranged in rows;
   and a laterally extending leading rotary shaft supporting on the cutter unit above and preceding the reaper elements relative to said travel direction.

2. A mechanism for harvesting standing crops for a combine constructed in accordance with claim 1:
   including a draw-in drum situated between said rotary shaft and the reaper element.

3. A mechanism for harvesting standing crops for a combine constructed in accordance with claim 2:
   wherein said draw-in drum is driven in rotation.

4. A mechanism for harvesting standing crops for a combine constructed in accordance with claim 2:
   including an auger for transporting plant parts laterally inwardly relative to the travel direction and said draw-in drum and auger are driven in rotation in the same direction.

5. A mechanism for harvesting standing crops for a combine constructed in accordance with claim 2:
   wherein said draw-in drum includes dogs,
   said separating devices arranged to form draw-in slots laterally between them corresponding with the plant rows and said dogs located in alignment with said slots.

6. A mechanism for harvesting standing crops for a combine constructed in accordance with claim 2:
   wherein said draw-in drum includes dogs on the surface.

7. A mechanism for harvesting standing crops for a combine constructed in accordance with claim 1:
   including a draw-in drum with the drum and rotary shaft being in alignment in a plane extending forwardly approximately 45° from the reaper elements and axial spacing between the draw-in drum and rotary shaft corresponds with the distance between the reaper elements and the draw-in drum.

8. A mechanism for harvesting standing crops for a combine constructed in accordance with claim 1:
   wherein said cutter unit is comprised of first and second parts, with a first part including a conveying channel for conveying stalks of a crop, a receiving table, a draw-in auger, a reaper element and a supporting frame and includes a front end attachment for attachment onto a combine and the second part includes the draw-in drum, the rotary shaft, the separating devices, a deflection shaft and lateral end walls.

9. A mechanism for harvesting standing crops for a combine comprising in combination:
   a cutter unit for a harvesting machine extending transversely relative to a direction of travel of the machine, said unit being vertically adjustable;
   draw-in and reaper elements on the cutter unit with said reaper elements having plant cutters;
   a plurality of forwardly extending laterally spaced separating devices fashioned as ships defining a plurality of row receiving slots between them for separating crop plants arranged in rows;
   a laterally extending leading rotary shaft supported on the cutter unit above and preceding the reaper element relative to said travel direction;
   and a deflection shaft positioned following the reaper element relative to the travel direction pulling down plant stalks from the reaper elements avoiding blockage and plugging of the reaper elements.

10. A mechanism for harvesting standing crops for a combine comprising in combination:
    a cutter unit for a harvesting machine extending transversely relative to a direction of travel of the machine, said unit being vertically adjustable;
    draw-in and reaper elements on the cutter unit with said reaper elements having plant cutters;
    a plurality of forwardly extending laterally spaced separating devices fashioned as ships defining a plurality of row receiving slots between them for separating crop plants arranged in rows;
    a laterally extending leading rotary shaft supported on the cutter unit above and preceding the reaper elements relative to said travel direction;
    and a deflection shaft extending transversely of the direction of travel with strippers thereon offset laterally relative to one another and having a lateral extent corresponding with draw-in slots formed between said separating devices.

11. The method of harvesting standing crops for a combine comprising the steps:
    positioning a cutter unit on a harvesting machine extending transversely relative to the direction of travel of the machine;
    separating rows of stalks as they pass into the cutter unit flattening the standing stalks ahead of the cutter in the direction of travel;
    cutting the tops of the stalks with a reaper and drawing in the cut tops so that the tops can be conveyed to a combine;
    and flattening the lower ends of the stalks and drawing the lower ends away from the reaper after the stalks are cut to avoid blockage and plugging of the reaper.

12. The method of harvesting standing crops for a combine in accordance with the steps of claim 11:
    including engaging the rows of stalks with dogs on a draw-in drum arranged in alignment with the rows.

13. The method of harvesting standing crops for a combine in accordance with the steps of claim 11:
    including engaging the stalks with strippers on a deflection shaft arranged in alignment with the rows of stalks as they pass into the cutter.

14. The method of harvesting standing crops for a combine in accordance with the steps of claim 11:
    including cutting tops from stalks after they are in a cutter unit, augering the cut tops laterally inwardly to a conveying channel leading to a combine.

* * * * *